(12) United States Patent
Xing et al.

(10) Patent No.: US 10,790,483 B2
(45) Date of Patent: Sep. 29, 2020

(54) POWER BATTERY TOP CAP STRUCTURE

(71) Applicant: Contemporary Amperex Technology Co., Limited, Ningde, Fujian (CN)

(72) Inventors: Chengyou Xing, Ningde (CN); Quankun Li, Ningde (CN); Peng Wang, Ningde (CN); Zhijun Guo, Ningde (CN)

(73) Assignee: Contemporary Amperex Technology Co., Limited, Fujian (CN)

( * ) Notice: Subject to any disclaimer, the term of this patent is extended or adjusted under 35 U.S.C. 154(b) by 248 days.

(21) Appl. No.: 15/881,089

(22) Filed: Jan. 26, 2018

(65) Prior Publication Data
US 2018/0233715 A1 Aug. 16, 2018

(30) Foreign Application Priority Data
Feb. 14, 2017 (CN) .......................... 2017 1 0077236

(51) Int. Cl.
| | | |
|---|---|---|
| *H01M 2/04* | (2006.01) | |
| *H01M 2/08* | (2006.01) | |
| *H01M 2/30* | (2006.01) | |
| *H01M 2/06* | (2006.01) | |
| *H01M 10/05* | (2010.01) | |

(52) U.S. Cl.
CPC ....... *H01M 2/0404* (2013.01); *H01M 2/0486* (2013.01); *H01M 2/06* (2013.01); *H01M 2/08* (2013.01); *H01M 2/30* (2013.01); *H01M 10/05* (2013.01)

(58) Field of Classification Search
CPC ..... H01M 2/0404; H01M 2/0486; H01M 2/08
See application file for complete search history.

(56) References Cited

U.S. PATENT DOCUMENTS

| | | | | |
|---|---|---|---|---|
| 2012/0183818 A1* | 7/2012 | Byun | ................... | H01M 2/0473 429/61 |
| 2015/0079446 A1* | 3/2015 | Byun | ..................... | H01M 2/30 429/121 |

FOREIGN PATENT DOCUMENTS

CN 105845851 A 8/2016

OTHER PUBLICATIONS

Extended European Search Report & Written Opinion issued in corresponding European Application No. 18275014 dated Apr. 19, 2018.

* cited by examiner

*Primary Examiner* — Osei K Amponsah
(74) *Attorney, Agent, or Firm* — Arent Fox LLP (57) ABSTRACT

A top cap structure for a power battery is provided. The power battery top cap structure includes a first and second electrode assemblies, and a top cap piece. The first electrode assembly includes a first electrode column having an upper and lower sections, a first seal member and a first connection block. The upper section and the first connection block are formed from a first base metal. The lower section is formed from a second base metal different from the first base metal. The upper section includes a step portion, and the lower section is joined with a bottom surface of the upper section below the top cap piece. The first seal member includes a horizontal extending portion. The horizontal extending portion is disposed between a lower surface of the top cap piece and the step portion. The top portion of the upper section connects with the first connection block.

13 Claims, 8 Drawing Sheets

POWER BATTERY TOP CAP STRUCTURE

CROSS-REFERENCE TO RELATED APPLICATION(S)

This application claims the benefit of Chinese Patent Application No. CN201710077236.9, entitled "POWER BATTERY TOP CAP STRUCTURE" and filed on Feb. 14, 2017 in the State Intellectual Property Office of the People's Republic of China (PRC) (SIPO), the disclosure of which is expressly incorporated by reference herein in its entirety.

BACKGROUND

Field

The present application relates to the technical field of energy storage devices, and particularly related to a power battery top cap structure.

Background

In a non-aqueous electrolyte secondary battery, the material that forms the electrode column of positive electrode is preferably aluminum or an aluminum alloy that is not soluble in a non-aqueous electrolyte under a positive voltage potential. On the other hand, the material that forms the electrode column of negative electrode is typically copper or another metal that does not form an alloy with the negative active material.

When forming a power battery group, a busbar needs to be welded onto a connection block of the positive electrode or a connection block of the negative electrode to connect the batteries in the group. However, because the busbar is typically formed by a single material (such as aluminum or copper), and the melting point of aluminum is lower than that of copper, and the specific heat capacity of aluminum is higher than that of copper, it is very difficult to weld a copper material and an aluminum material together by way of ultrasonic welding, laser welding and the like. Accordingly, the connection blocks of the positive electrode and the negative electrode within the top cap structure of a power battery need to be formed with the same material as that used to form the busbar. That is to say, it is necessary that both the connection blocks of the positive electrode and the negative electrode are formed by an aluminum material or that both are formed by a copper material. In a related technology, a conventional technical solution is a copper aluminum electrode column formed by friction welding. In particular, the lower section of the electrode column is formed by a material consistent with the material that forms the corresponding electrode (for example, an aluminum material), and at the same time, the upper section of the same electrode column is formed by a material consistent with the material that forms the busbar (for example, a copper material). The two sections mentioned above are joined together by way of friction welding.

SUMMARY

The present application provides a power battery top cap structure.

An embodiment of the present application provides a power battery top cap structure, which includes a first electrode assembly, a second electrode assembly, and a top cap piece. The first electrode assembly includes a first electrode column, a first seal member and a first connection block. The first electrode column includes an upper section and a lower section. Both a material forming the upper section and a material forming the first connection block include a first base metal. A material forming the lower section includes a second base metal. The first base metal is different from the second base metal. The upper section includes a step portion, and the lower section is joined with a bottom surface of the upper section. The first seal member includes a horizontal extending portion. The top cap piece includes a first electrode column hole. The upper section passes through the first electrode column hole. The step portion and the lower section are below the top cap piece. The horizontal extending portion is disposed between a lower surface of the top cap piece and the step portion. The first connection block is above the top cap piece, and a top portion of the upper section is connected with the first connection block. The second electrode assembly is attached to the top cap piece.

Preferably, the first electrode assembly further includes a first conductive plate. A material forming the first conductive plate includes the second base metal. The first conductive plate is below the top cap piece and includes a first through hole. The upper section sequentially passes through the first through hole and the first electrode column hole. The first through hole includes a first step section. The step portion of the upper section engages the first step section in a snap fit. The lower section contacts and electrically connects with the first conductive plate. The horizontal extending portion is disposed between the lower surface of the top cap piece and the first conductive plate.

Preferably, the lower section is welded to the first conductive plate. Preferably, the upper section and the lower section are joined to each other by at least one of a cold rolling process, a hot rolling process, an explosive compound process, an explosive rolling process, or a friction welding process. Preferably, the horizontal extending portion surrounds the first through hole, and the horizontal extending portion seals the lower surface of the top cap piece and an upper surface of the first conductive plate. The lower section and the first through hole are joined and sealed. Preferably, the first electrode assembly further includes a first lower insulation member. The first lower insulation member is disposed between the lower surface of the top cap piece and an upper surface of the first conductive plate. Preferably, the lower section is received within the first through hole. Preferably, when a radial dimension of the lower section is greater than a radial dimension of the step portion, the first through hole further includes a second step section. The second step section is arranged below the first step section, and the second step section receives the lower section. Preferably, a radial dimension of the lower section is substantially equal to a radial dimension of the step portion. Preferably, the first connection block further includes a riveting hole, and the upper section is riveted to the first connection block through the riveting hole. Preferably, the upper section is welded to the first connection block. Preferably, the first base metal is copper and the second base metal is aluminum, or the first base metal is aluminum and the second base metal is copper.

Embodiments of the present application provide a power battery top cap structure that advantageously allows the stress force applied on the first electrode column by the first seal member to be concentrated completely on the upper section of the first electrode column, rather than on both the upper section and the lower section of the first electrode column. That is to say, the joint surface between the upper section and the lower section is not subjected to a pulling force. As a result, the power battery top cap structure effectively avoids cracks or breaks from occurring on the joint surface between the upper section and the lower section.

It is to be understood that both the foregoing general description and the following detailed description are for descriptive purposes only, and are not intended to limit the scope of the present application.

Description of element symbols: 1—power battery top cap structure; 10—first electrode assembly; 100—first electrode column; 1000—upper section; 1000a—step portion; 1000b—riveting portion; 1002—lower section; 102—first seal member; 1020—cylindrical seal portion; 1022—horizontal extending portion; 104—first connection block; 1040—riveting hole; 106—first conductive plate; 1060—first through hole; 1060a—first step section; 1060b—second step section; 108—first lower insulation member; 12—second electrode assembly; 120—second electrode column; 122—second seal member; 124—second connection block; 126—second conductive plate; 128—second lower insulation member; 14—top cap piece; 2—bare battery core; 20—positive electrode lug; 22—negative electrode lug; 3—bare battery core insulation layer; and 4—shell body.

The drawings as described above are incorporated into the Detailed Description to constitute a part of the Detailed Description of the present application. The drawings show one or more embodiments according to the present application, and are used along with the Detailed Description for describing the mechanism of the present application.

DETAILED DESCRIPTION

The present application will be further described in details in reference to specific exemplary embodiments and accompanying drawings. The terms "front," "rear," "left," "right," "top" and "low" are used in the present application with respective to the power battery top cap structure shown in the drawings of the present application.

In a power battery top cap structure, because an electrode column not only plays a role in electric conduction, but also functions to secure the first seal member and the insulation member, following the power battery assembly, the electrode column will receive a stress force from the first seal member. The stress force may pull the copper section and the aluminum section of the electrode column respectively towards the upper side and lower side of the top cap. As a result, the joint surface of the copper section and the aluminum section of the electrode column will be subjected to the pulling stress force. Accordingly, after a period of use, the foregoing joint surface of the power battery may crack or even break, causing liquid spillage. Such a problem can occur more frequently in a power battery with an electrode column that has a relatively small diameter. Embodiments are provided infra that may prevent such structural degradation of the electrode column and the power battery.

Figure 1:
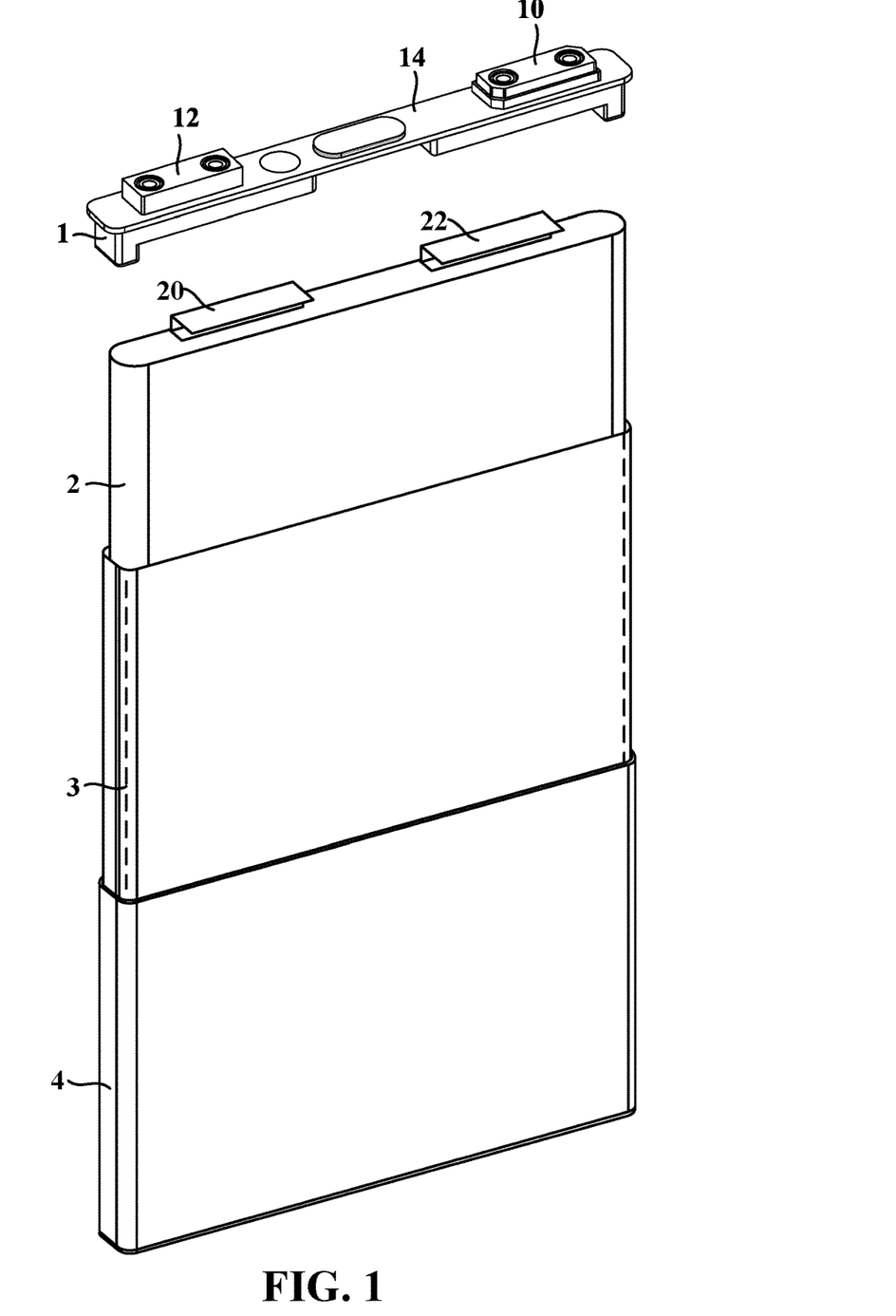
FIG. 1 is a schematic exploded view of the structure of the power battery provided in an embodiment of the present application.

As shown in FIG. 1, an embodiment of the present application provides a power battery, which includes a power battery top cap structure 1, a bare battery core 2, a bare battery core insulation layer 3 and a shell body 4. The bare battery core 2 includes a positive electrode piece, a negative electrode piece, and a diaphragm between the positive electrode piece and the negative electrode piece. The bare battery core 2 is first wrapped by the bare battery core insulation layer 3, and then is placed in the shell body 4. Next, the assembly is capped by the power battery top cap structure 1. After the electrolyte is loaded, a complete power battery is formed.

Figure 2:
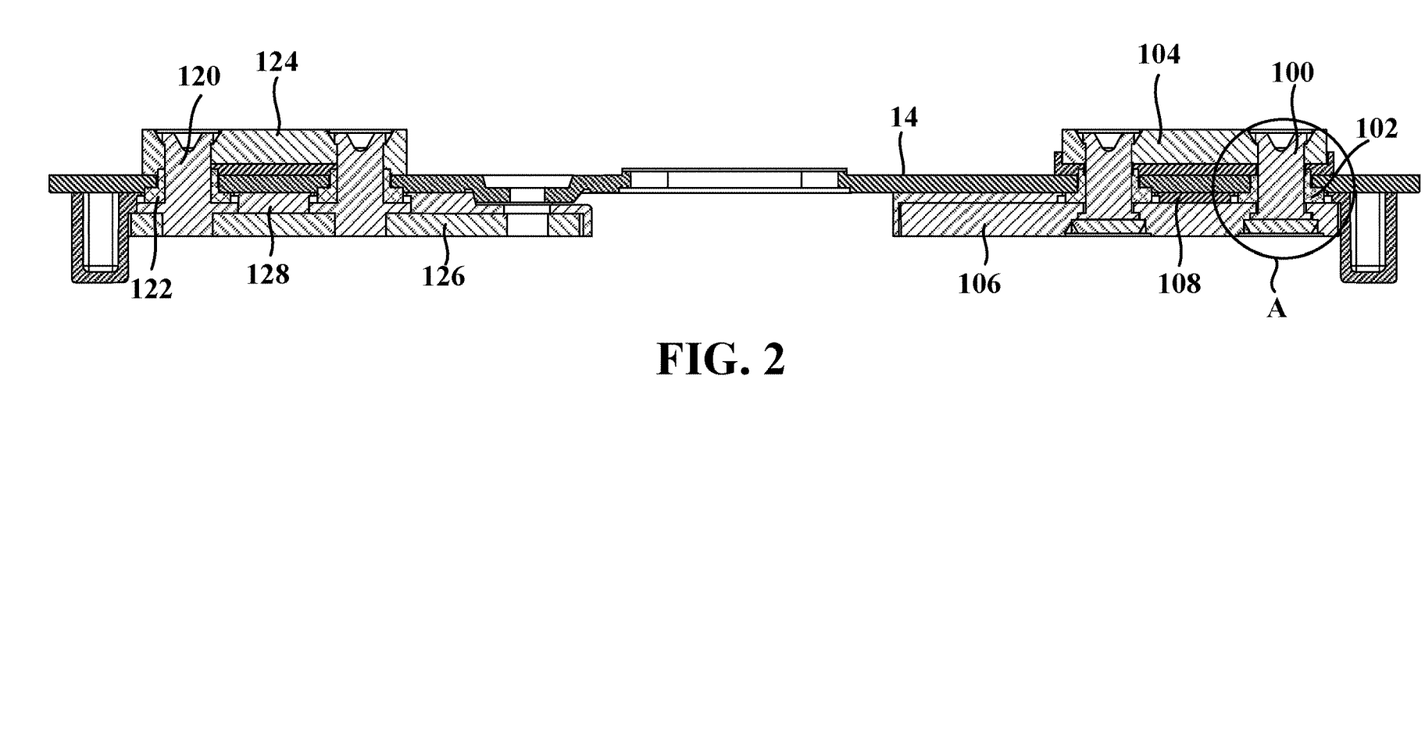
FIG. 2 is a schematic side sectional view of the power battery top cap structure provided in an embodiment of the present application.

As shown in FIG. 1, the power battery top cap structure 1 includes a first electrode assembly 10, a second electrode assembly 12, and a top cap piece 14. As shown in FIG. 2, the first electrode assembly 10 includes a first connection block 104; and the second electrode assembly 12 includes a second connection block 124. In order to form a battery group, in this embodiment, the first connection block 104 and the second connection block 124 have the same material as the busbar (for example, both of them are made of copper, or both of them are made of aluminum). It is noted that, as used here, two or more elements having the same material refers to the two or more elements having the same base metal (base metal refers to the main metal component of an alloy). For example, when the material forming the first connection block 104 is a pure aluminum material, or an alloy of aluminum manganese, the material forming the second connection block 124 may be a pure aluminum material, or an alloy of aluminum manganese, or an alloy of aluminum silicon, or an alloy of aluminum magnesium, etc., as long as their base metal is aluminum. In this embodiment of the present application, the base metal of the material forming the first connection block 104 is referred to as the first base metal. For example, the first connection block 104 may be made of pure copper or a copper alloy (the first base metal is copper). Alternatively, the first connection block 104 may be made of pure aluminum or an aluminum alloy (the first base metal is aluminum). The following description discusses embodiments where the first base metal is aluminum, but in other embodiments, the first base metal may be copper.

The bare battery core 2 includes a positive electrode lug 20 and a negative electrode lug 22, in which the positive electrode lug 20 is made of an aluminum material, while the negative electrode lug 22 is made of a copper material. As a result, a negative electrode column provides an interface to transition from the copper of the negative electrode lug 22 to the aluminum of the first connection block 104. In one embodiment of the present application, the first electrode assembly 10 is electrically connected to the negative electrode of the power battery. In addition to the first connection block 104, the first electrode assembly 10 also includes a first electrode column 100, a first seal member 102, a first conductive plate 106, and a first lower insulation member 108.

Figure 3:
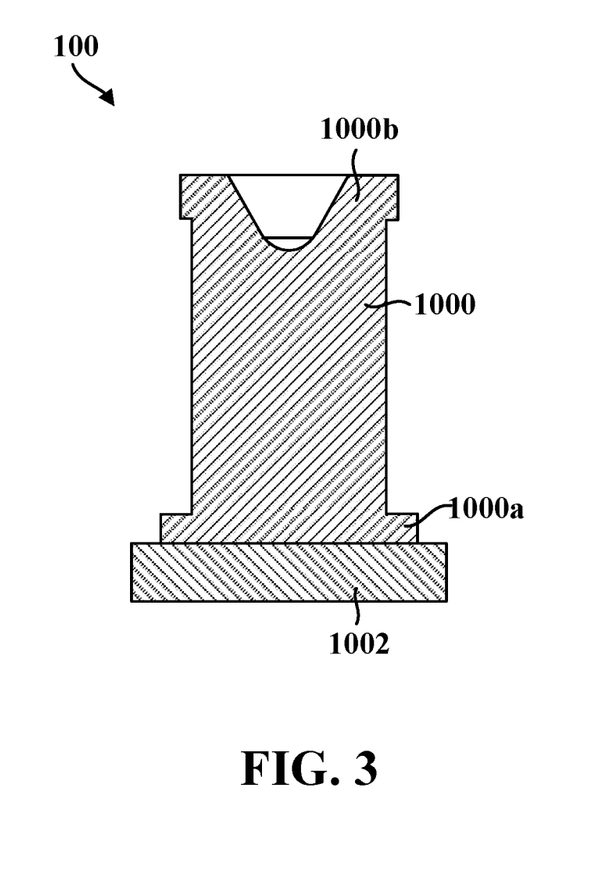
FIG. 3 is a schematic view of the specific structure of a first electrode column provided in an embodiment of the present application.
Figure 6:
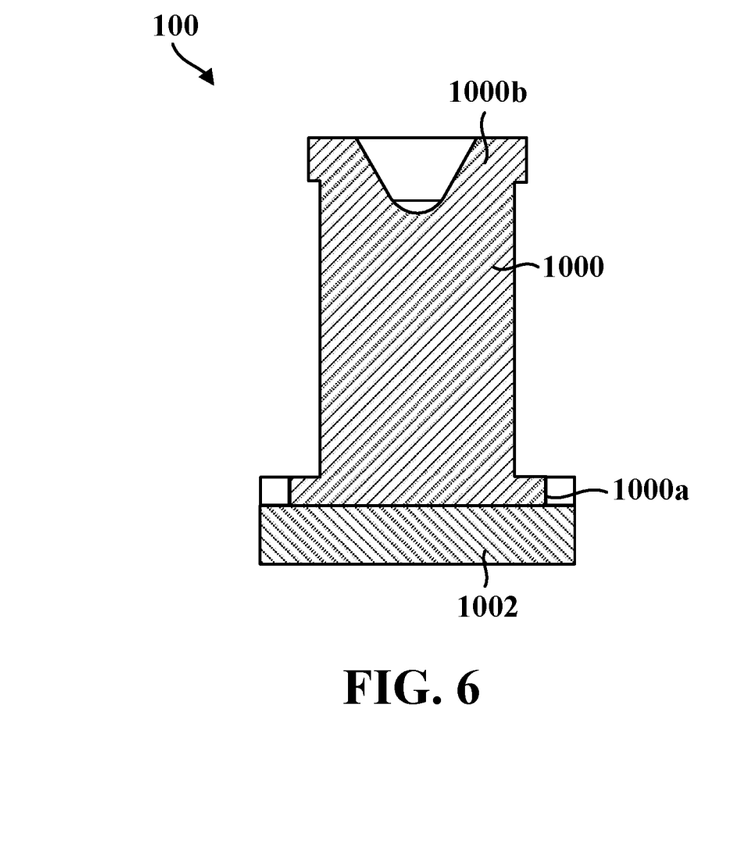
FIG. 6 is a schematic view of the specific structure of another first electrode column provided in an embodiment of the present application.

As shown in FIG. 3 and FIG. 6, the first electrode column 100 includes an upper section 1000 and a lower section 1002. Both the upper section 1000 and the first connection block 104 are formed from the same first base metal. More specifically, the material forming them is an aluminum material (the first base metal is aluminum). The lower section 1002 is formed from a second base metal. In addition, the second base metal is different from the first base metal. More specifically, the material forming the lower section 1002 is a copper material (the second base metal is copper). The surfaces of the electrode lug lower section 1002 and the upper section 1000 may be joined together by a cold rolling process, a hot rolling process, an explosive compound process, an explosive rolling process, or a friction welding process. Through a cold rolling process, a hot rolling process, an explosive compound process, an explosive rolling process, or a friction welding process, the lower section 1002 and the upper section 1000 are joined together to ensure that a stable electrically conductive surface is formed between the lower section 1002 and the upper section 1000. In this way, the embodiment of the present application is able to avoid fluctuation in the contact electrical resistance between the lower section 1002 and the upper section 1000 caused by shaking, impacting and other external factors. In addition, the upper section 1000 includes a radially-projected step portion 1000a. Preferably, the step portion 1000a is arranged in a lower part of the upper section 1000, so as to allow sufficient space for installing the first seal member 102, the first conductive plate 106 and the first lower insulation member 108, etc.

Figure 5:
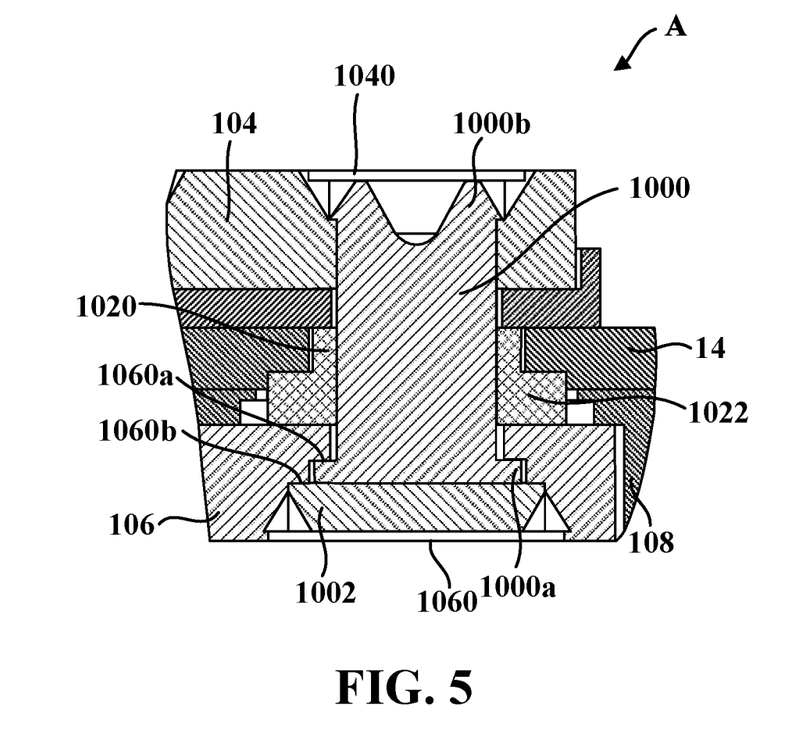
FIG. 5 is a partial enlarged view of part A of the power battery top cap structure shown in FIG. 2 that includes the first electrode column shown in FIG. 3 and the first conductive plate shown in FIG. 4.
Figure 8:
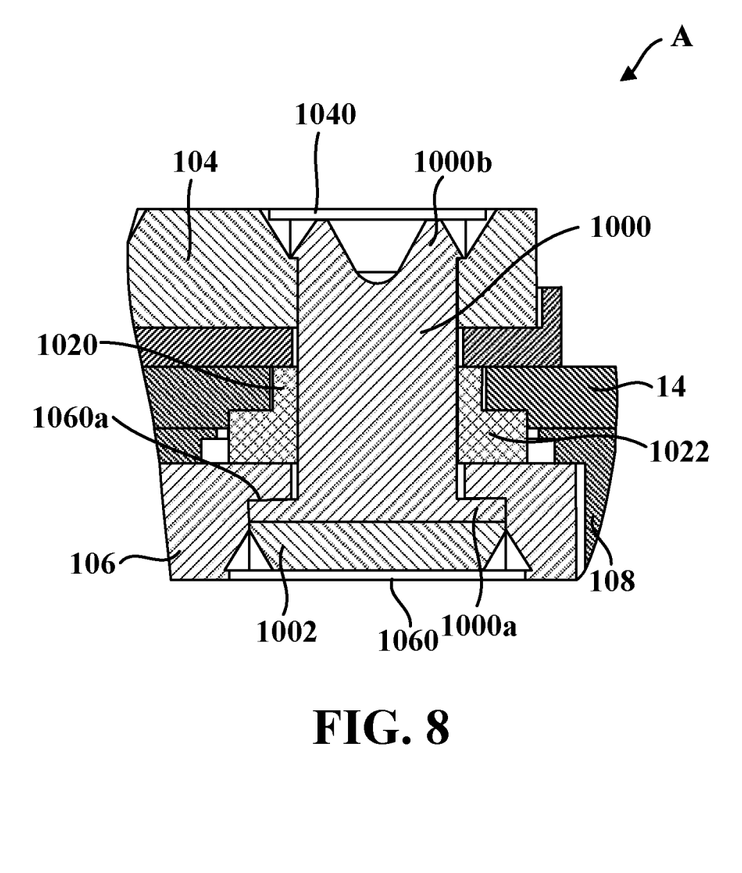
FIG. 8 is a partial enlarged view of part A of the power battery top cap structure shown in FIG. 2 that includes the first electrode column shown in FIG. 6 and the first conductive plate shown in FIG. 7.

As shown in FIGS. 5 and 8, the top cap piece 14 has a first electrode column hole (not shown). The first seal member 102 includes a cylindrical seal portion 1020 and a horizontal extending portion 1022. The cylindrical seal portion 1020 covers the upper section 1000, and extends into the first electrode column hole along with the upper section 1000. At the same time, the bottom portion of the cylindrical seal portion 1020 is below the lower surface of the top cap piece 14 and extends horizontally. The horizontally extending portion of the first seal member 102 forms the horizontal extending portion 1022. In another aspect, the cylindrical seal portion 1020 may have a shape other than cylindrical. The upper section 1000 passes through the first electrode column hole and its top portion is above the top cap piece 14. Both the step portion 1000a and the lower section 1002 are below the top cap piece 14. In such an embodiment, the horizontal extending portion 1022 of the first seal member 102 is disposed between the lower surface of the top cap piece 14 and the step portion 1000a.

The lower section 1002 may electrically connect with the negative electrode lug 22 directly. However, it is noted that such a direct connection between the negative electrode lug 22 and the lower section 1002 may result in a downward pulling force on the lower section 1002. Accordingly, such a pulling force may cause a crack or even a break on the joint surface between the lower section 1002 and the upper section 1000. Moreover, the surface area of the lower section 1002 may be very small. As a result when the lower section 1002 is connected to the negative electrode lug 22 directly, it may lead to a relatively small electrical conducting area and accordingly a relatively high electrical resistance, which may further cause a heat problem.

Figure 4:
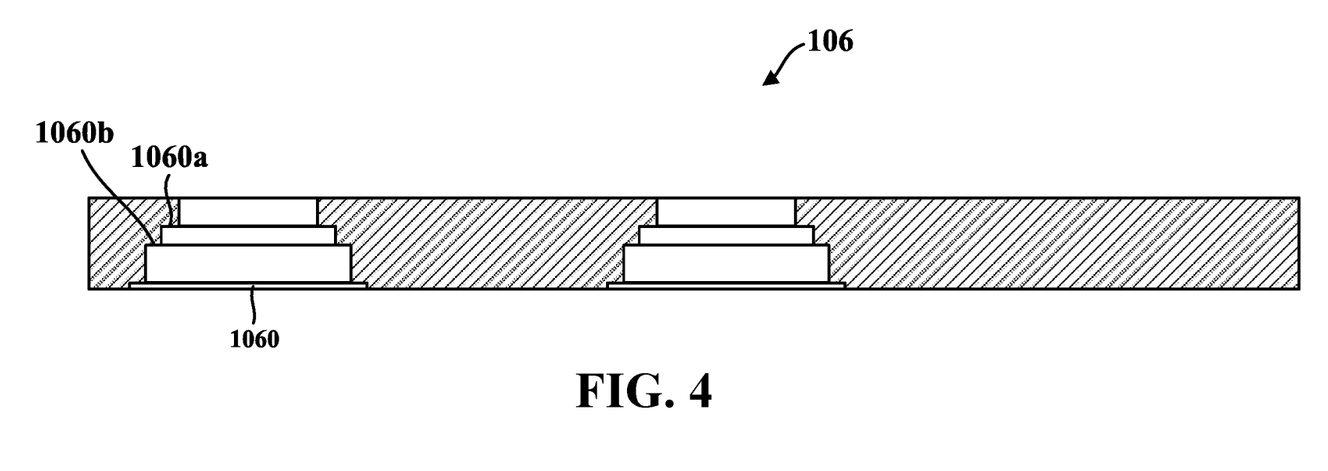
FIG. 4 is a schematic view of the specific structure of a first conductive plate provided in an embodiment of the present application.
Figure 7:
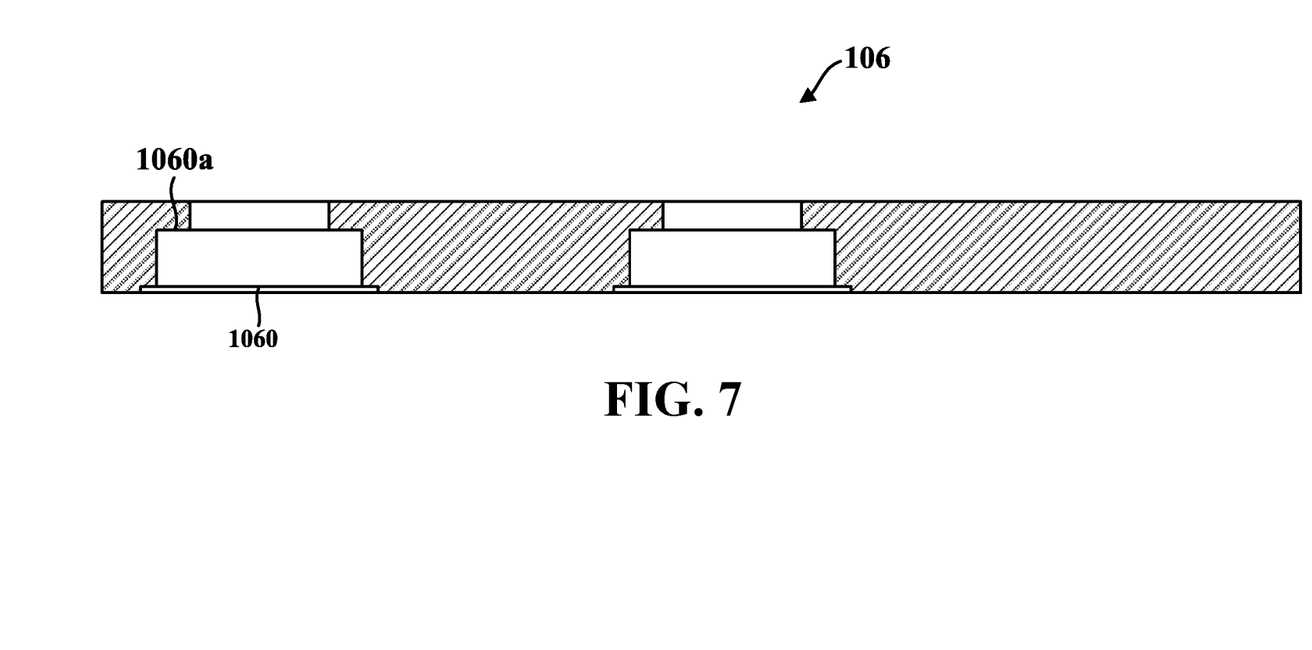
FIG. 7 is a schematic view of the specific structure of another first conductive plate provided in an embodiment of the present application.

Therefore, in this embodiment of the present application, the first conductive plate 106 is connected to the negative electrode lug 22 (such connection can be either a direct connection or an indirect connection). Specifically, the material forming the first conductive plate 106 is a copper material (the base metal is copper). That is to say, both the first conductive plate 106 and the lower section 1002 are formed by the material of the second base metal-copper. The first conductive plate 106 is arranged below the top cap piece 14. As shown in FIGS. 4 and 7, the first conductive plate 106 includes a first through hole 1060. The first through hole 1060 has a first step section 1060s disposed therein. The upper section 1000 sequentially passes through the first through hole 1060 and the first electrode column hole of the top cap piece 14, allowing the step portion 1000a of the upper section 1000 and the first step section 1060a to be snapped together in a snap fit. Such a structure helps to prevent the first conductive plate 106 from moving downwards. The lower section 1002 contacts and electrically connects with the first conductive plate 106. In such a way, the first conductive plate 106 extends into the space between the horizontal extending portion 1022 of the first seal member 102 and the lower surface of the top cap piece 14.

Because the surface area of the first conductive plate 106 is relatively large, the contact area between the negative electrode lug 22 and the first conductive plate 106 may also be large, reducing the electrical resistance between them, and hence reducing heat generation. At the same time, in such a structure, the downward pulling force applied on the first conductive plate 106 by the negative electrode lug 22 is directly transferred to the step portion 1000a via the first step section 1060a, avoiding a downward pulling force on the joint surface between the upper section 1000 and the lower section 1002. Moreover, in some embodiments, a plurality of small first electrode columns 100 may be provided within the first electrode assembly 10 in order to distribute the transfer of the electric power.

The upper section 1000 and the lower section 1002 are formed from different materials. As a result, when the joint surface between the upper section 1000 and the lower section 1002 is exposed to an electrolyte, electrochemical corrosion may occur and the joint structure between the two sections may be damaged. Therefore, in this embodiment of the present application, the joint surface between the upper section 1000 and the lower section 1002 is sealed to prevent it from contacting the electrolyte.

Specifically, as shown in FIGS. 5 and 8, in this embodiment, the horizontal extending portion 1022 surrounds the first through hole 1060. The lower surface of the top cap piece 14 and the upper surface of the first conductive plate 106 are sealed by the horizontal extending portion 1022 to prevent the electrolyte from entering the first through hole 1060 through the top portion of the first through hole 1060. At the same time, the lower section 1002 is received within the first through hole 1060. In addition, the lower section 1002 and the first through hole 1060 are joined and sealed by welding or the like. The foregoing structure is able to prevent the electrolyte from entering the first through hole 1060 via the bottom portion of the first through hole 1060 and reaching the joint surface between the upper section 1000 and the lower section 1002. Accordingly, the joint surface is within a completely sealed environment. In addition, such a structure ensures that a stable electrical conducting surface is formed between the lower section 1002 and the first conductive plate 106, effectively avoiding fluctuation in the contact electrical resistance between the lower section 1002 and the first conductive plate 106 caused by shaking, impacting and other external factors.

In this embodiment, the lower section 1002 may be connected to the first conductive plate 106 through one of a number of different configurations. In one configuration, when the radial dimension of the lower section 1002 is greater than the radial dimension of the first through hole 1060, the upper surface of the lower section 1002 is connected to the lower surface of the first conductive plate 106. However, in this configuration, the lower section 1002 may protrude from the first conductive plate 106, resulting in a waste of the space within a power battery.

Preferably, the radial dimension of the lower section 1002 is made consistent with the radial dimension of the first through hole 1060 (the two dimensions being consistent denotes the two dimensions are substantially the same size). The outer circumferential surface of the lower section 1002 is connected to the inner circumferential surface of the first through hole 1060. In addition, in this configuration, the specific structure of the first through hole 1060 may be further adjusted on the basis of the difference between the radial dimension of the lower section 1002 and the radial dimension of the step portion 1000a. For example, when the radial dimension of the lower section 1002 is greater than the radial dimension of the step portion 1000a (see FIG. 3), a second step section 1060b may be further provided within the first through hole 1060, and the second step section 1060b is arranged below the step portion 1060a (see FIG. 4). In such a configuration, when the step portion 1000a of the upper section 1000 is snapped securely with the first step section 1060a within the first through hole 1060, the second step section 1060b receives the lower section 1002 (see FIG. 5). On the other hand, when the radial dimension of the lower section 1002 is equal to the radial dimension of the step portion 1000a (see FIG. 6), it is not necessary to add the second step section 1060b (see FIG. 7). In this configuration, both the lower section 1002 and the step portion 1000a may be received in a space below the first step section 1060a within the first through hole 1060 (see FIG. 8). It is noted in the foregoing configuration that when the radial dimension of the lower section 1002 is described as being equal to the radial dimension of the step portion 1000a, it denotes the radial dimension of the two are substantially the same without considering the tolerance thereof. In order to facilitate the battery assembly, it may be desirable for the lower section 1002 and the step portion 1000a to be engaged with a gap.

In this embodiment, when the radial dimension of the lower section 1002 is significantly greater than that of the step portion 1000a, or when a first conductive plate 106 is provided, in order to prevent electric contact between the first electrode column 100 or the first conductive plate 106 and the lower surface of the top cap piece 14, a first lower insulation member 108 is further provided. The first lower insulation member 108 is arranged between the lower surface of the top cap piece 14 and the upper surface of the lower section 1002 or of the first conductive plate 106. In a typical configuration, the first lower insulation member 108 surrounds the first seal member 102.

The first connection block 104 is disposed above the top cap piece 14. The top portion of the upper section 1000 is connected to the first connection block 104. At the same time, the first electrode column 100 is applied with an upward pulling force, which forces the step portion 1000a to press against the first seal member 102, the first conductive plate 106, and the first lower insulation member 108. As a result, these three components are tightly secured below the top cap piece 14.

The first connection block 104 may be connected to the upper section 1000 in many different configurations. One simple configuration is to provide a riveting hole 1040 on the first connection block 104 so that the top portion of the upper section 1000 is riveted via the riveting hole 1040. In order to facilitate the deformation of the top portion of the upper section 1000 during the riveting process, a riveting portion 1000b may be further provided on the top portion of the upper section 1000 (see FIG. 3 and FIG. 6). The riveting portion 1000b may easily deform in the riveting process, and thus may be tightly engaged in the riveting hole 1040 (see FIG. 5 and FIG. 8) to finish the riveting process. In addition, to further enhance the connection between the first electrode column 100 and the first connection block 104, as well as to avoid fluctuation in the contact electrical resistance between the first electrode column 100 and the first connection block 104, the present embodiment may further enhance the connection between the upper section 1000 and the riveting hole 1040 via a welding process.

Because the positive electrode lug 20 of a power battery is also formed by an aluminum material, the second electrode assembly 12 may be attached to the top cap piece 14 as the positive electrode output terminal of the power battery. As shown in FIG. 2, in such a case, the second electrode assembly 12 includes, in addition to the second connection block 124, a second electrode column 120, a second seal member 122, a second conductive plate 126, and a second lower insulation member 128. The second electrode column 120 may be formed by a pure aluminum material. The positive electrode lug 20 may have a direct electric connection with the second connection block 124 via the second electrode column 120. The second electrode column 120 also passes through the top cap piece 14, and may be sealed by the second seal member 122. For an explanation of the configurations and function of the connection between the second conductive plate 126 and the second lower insulation member 128, please refer to the corresponding descriptions for the first conductive plate 106 and the first lower insulation member 108. These descriptions will be not repeated herein for brevity.

The foregoing is an embodiment of the present invention in which the first electrode assembly 10 is connected to the negative electrode, the second electrode assembly 12 is connected to the positive electrode, and the busbar uses aluminum as the base metal.

In an embodiment in which the busbar uses copper as the base metal, the first electrode assembly 10 is connected to the positive electrode, and the second electrode assembly 12 is connected to the negative electrode. In this embodiment, the positive electrode provides an interface to transition from the aluminum of the positive electrode lug 20 to the copper of the first connection block 104. More specifically, the base metals of the first conductive plate 106, the first connection block 104, the second connection block 124, the upper section 1000 and the lower section 1002 need to be changed, such that the base metal of the first conductive plate 106 and the lower section 1002 is aluminum, while the base metal of the first connection block 104, the second connection block 124 and the upper section 1000 is copper. The connection structure of the various components is the same as disclosed in the previously described embodiment of the present application, and will not be repeated herein.

The power battery top cap structure provided in the embodiments of the present application is able to effectively prevent cracks or breaks in the joint surface between the upper section and the lower section.

Described above are exemplary embodiments of the present application, and is not intended to limit the present application. To a person of ordinary skill in the art, the present application may have various changes and modifications. Any modification, replacement or improvement based on the present application shall be encompassed within the scope of the present application.

What is claimed is:

1. A power battery top cap structure, comprising:
a first electrode assembly comprising a first electrode column, a first seal member, and a first connection block, wherein the first electrode column comprises an upper section and a lower section, both a material forming the upper section and a material forming the first connection block comprise a first base metal, a material forming the lower section comprises a second base metal, wherein the first base metal is different from the second base metal, wherein the upper section comprises a step portion, and the lower section is joined with a bottom surface of the upper section, and wherein the first seal member comprises a horizontal extending portion;
a top cap piece comprising a first electrode column hole, wherein the upper section passes through the first electrode column hole, wherein the step portion and the lower section are below the top cap piece, the horizontal extending portion is disposed between a lower surface of the top cap piece and the step portion, the first connection block is above the top cap piece, and a top portion of the upper section is connected with the first connection block; and
a second electrode assembly that is attached to the top cap piece.

2. The power battery top cap structure according to claim 1, wherein the first seal member further comprises a cylindrical seal portion, wherein the cylindrical seal portion covers the upper section.

3. The power battery top cap structure according to claim 1, wherein the first electrode assembly further comprises a first conductive plate, a material forming the first conductive plate comprising the second base metal, wherein the first conductive plate is below the top cap piece and comprises a first through hole, the upper section passes through the first through hole and the first electrode column hole, wherein the first through hole comprises a first step section, and wherein the step portion of the upper section engages the first step section in a snap fit, the lower section contacts with the first conductive plate, and the horizontal extending portion is disposed between the lower surface of the top cap piece and the first conductive plate.

4. The power battery top cap structure according to claim 3, wherein the lower section is welded to the first conductive plate.

5. The power battery top cap structure according to claim 1, wherein the upper section and the lower section are joined to each other by at least one of a cold rolling process, a hot rolling process, an explosive compound process, an explosive rolling process, or a friction welding process.

6. The power battery top cap structure according to claim 4, wherein the horizontal extending portion surrounds the first through hole, and the horizontal extending portion seals the lower surface of the top cap piece and an upper surface of the first conductive plate, and wherein the lower section and the first through hole are joined and sealed.

7. The power battery top cap structure according to claim 3, wherein the first electrode assembly further comprises a first lower insulation member, and wherein the first lower insulation member is disposed between the lower surface of the top cap piece and an upper surface of the first conductive plate.

8. The power battery top cap structure according to claim 3, wherein the lower section is received within the first through hole.

9. The power battery top cap structure according to claim 8, wherein a radial dimension of the lower section is greater than a radial dimension of the step portion, wherein the first through hole further comprises a second step section, and wherein the second step section is arranged below the first step section, and the second step section receives the lower section.

10. The power battery top cap structure according to claim 8, wherein a radial dimension of the lower section is substantially equal to a radial dimension of the step portion.

11. The power battery top cap structure according to according to claim 1, wherein the first connection block further comprises a riveting hole, and the upper section is riveted to the first connection block through the riveting hole.

12. The power battery top cap structure according to claim 11, wherein the upper section is welded to the first connection block.

13. The power battery top cap structure according to claim 1, wherein the first base metal is copper and the second base metal is aluminum, or the first base metal is aluminum and the second base metal is copper.

* * * * *